United States Patent
Beidas et al.

(10) Patent No.: US 6,363,131 B1
(45) Date of Patent: *Mar. 26, 2002

(54) METHOD AND APPARATUS FOR JOINT TIMING SYNCHRONIZATION AND FREQUENCY OFFSET ESTIMATION

(75) Inventors: Bassel F. Beidas, Alexandria, VA (US); Yezdi F. Antia, Gaithersburg; Mohammad Soleimani, Rockville, both of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/109,798

(22) Filed: Jul. 2, 1998

Related U.S. Application Data

(60) Provisional application No. 60/083,481, filed on Apr. 29, 1998.

(51) Int. Cl.[7] .................. H04L 7/00; H04L 27/30; H04B 15/00; H04K 1/00
(52) U.S. Cl. .................. 375/368; 375/210; 375/206
(58) Field of Search .................. 375/368, 13, 90, 375/336, 340, 1, 207, 20, 210, 150, 206; 380/33; 178/88; 370/100.1, 206

(56) References Cited

U.S. PATENT DOCUMENTS

| | | | | |
|---|---|---|---|---|
| 4,007,331 A | * | 2/1977 | Flanagan | 178/88 |
| 4,621,365 A | * | 11/1986 | Chiu | 375/1 |
| 5,022,047 A | * | 6/1991 | Dixon et al. | 375/1 |
| 5,117,441 A | * | 5/1992 | Weigand | 375/90 |
| 5,177,740 A | * | 1/1993 | Toy et al. | 370/100.1 |
| 5,276,706 A | * | 1/1994 | Critchlow | 375/13 |
| 5,438,595 A | * | 8/1995 | Cheng et al. | 375/340 |
| 5,463,627 A | * | 10/1995 | Matsuoka | 370/350 |
| 5,469,469 A | * | 11/1995 | Haines | 375/201 |
| 5,566,202 A | * | 10/1996 | Lang | 375/210 |
| 5,648,982 A | * | 7/1997 | Durrant et al. | 375/206 |
| 5,764,690 A | * | 6/1998 | Blanchard et al. | 375/206 |
| 5,784,403 A | * | 7/1998 | Scott | 375/207 |
| 5,809,009 A | * | 9/1998 | Matsuoka et al. | 370/206 |
| 6,069,915 A | * | 5/2000 | Hulbert | 375/150 |

OTHER PUBLICATIONS

Qi Bi AT&T Bell Laboratories, Perfermance Analysis of a CDMA Cellular System 1992, I.E.E.E., p.p. 43 –46.*

* cited by examiner

Primary Examiner—Chi Pham
Assistant Examiner—Tony Al-Beshrawi
(74) Attorney, Agent, or Firm—John T. Whelan; Michael W. Sales

(57) ABSTRACT

A burst analyzer is useful in a digital communication system in which a signal burst has a plurality of reference segments distributed within the signal burst for transmission of a plurality of reference signals. The burst analyzer includes a filter that compares the received signal, for each reference segment thereof, with each reference signal offset by one of a plurality of time offsets to generate correlation data. The burst analyzer then determines, for each reference segment of the signal burst, a maximum correlation value from the correlation data for each time offset. Then the burst analyzer determines the time offset at which a sum of the maximum correlation values, over the plurality of reference segments, is a maximum. The burst analyzer jointly generates a frequency domain representation of the correlation data associated with the time offset at which the maximum correlation sum is a maximum, and then determines a frequency at which the frequency domain representation is a maximum.

52 Claims, 8 Drawing Sheets

METHOD AND APPARATUS FOR JOINT TIMING SYNCHRONIZATION AND FREQUENCY OFFSET ESTIMATION

RELATED APPLICATION

This application is based on and claims benefit from a provisional application entitled "Efficient Method of Joint Timing Synchronization and Frequency Offset Estimation", filed on Apr. 29, 1998, and accorded Ser. No. 60/083,481.

BACKGROUND OF THE INVENTION

1. Field of the Invention

The invention relates generally to digital communication systems and, more particularly, to systems utilizing reference symbols for timing synchronization and frequency offset estimation.

2. Description of the Related Art

Digital communication systems typically utilize bandwidth-efficient modulation schemes to maintain high bit rates for a number of user channels. Such systems transmit bursts of information symbols that may include both reference symbols and data symbols. The reference symbols are known by a receiver to provide timing and frequency information, thereby assisting in the demodulation of the data symbols. Even though typical satellite digital communication systems may provide mechanisms (e.g., a random access channel (RACH) burst) for providing a receiver with ranges for the timing and frequency of a signal burst, such ranges are insufficient for demodulation. The actual timing and frequency must be identified within the given range. Moreover, the timing and frequency can change for a variety of reasons, including Doppler frequency shift due to satellite motion, propagation delays, and oscillator drift.

In order to demodulate the data symbols accurately, the clock in the receiver must be synchronized with the clock in the transmitter and, further, the oscillator in the receiver must be to aligned with the actual carrier frequency (i.e., the received carrier frequency). With certain modulation schemes (e.g., QPSK), the receiver is capable of deriving timing and frequency information from the information symbols themselves subsequent to removing the modulation. These conveniences are not available with modulation schemes such as GMSK (Gaussian Minimum Shift Keying), in which modulated information is transmitted over a plurality of bit periods, inasmuch as no single non-linearity exists for modulation removal. However, such memory-inducing modulation schemes provide several advantages, not the least of which is the constant envelope of the transmitted signal. This advantage is particularly useful for satellite communication systems, inasmuch as cheaper Class C amplifiers may be used in both the satellites and the receivers.

In the interest of accurately estimating the timing of the burst, past transmission formats have bundled the reference symbols in a unique word having data with considerable variation (such that the transmitted signal has high frequency components). On the other hand, to attain accurate frequency estimates, past transmission formats have set all of the reference symbols in the unique word to "1" to obtain high resolution for the frequency variable. Because both the timing and frequency offset of the burst must be determined, past signal bursts have included a single, lengthy preamble segment to provide a suitable number of reference bits for each operation. The length of the preamble, of course, comes at the expense of a lower data throughput rate.

In light of the above, it would be desirable to determine accurately both the timing and frequency of a burst from a minimum number of reference symbols transmitted therein, particularly in the context of constant envelope, bandwidth-efficient modulation schemes with reference symbols spanning a plurality of bit periods. It would also be desirable to make such a joint determination without having to estimate the carrier phase, signal amplitude, or noise level, and further without having to compensate for fading in the channel.

SUMMARY OF THE INVENTION

The method and apparatus of the present invention is useful in a digital communication system in which a signal burst is transmitted. According to one aspect of the present invention, a burst analyzer comprises a filter that generates correlation data based on the signal burst and a plurality of reference signals offset by a plurality of time offsets and an accumulator that combines quantities based on the correlation data generated by the filter for a plurality of reference segments distributed within the signal burst.

According to another aspect of the present invention, a method of synchronization in a digital communication system transmitting a signal burst includes the step of calculating correlation data based on the signal burst and a plurality of reference signals offset by a plurality of time offsets. The method also includes the step of combining quantities based on the correlation data for a plurality of reference segments distributed throughout the signal burst.

According to yet another aspect of the present invention, a method is useful for synchronization in a digital communication system transmitting a signal burst modulated by a modulation scheme that induces memory therein. The method comprises the steps of comparing the signal burst with a plurality of possible reference waveforms to generate comparison data not reflecting the memory induced by the modulation scheme and combining quantities based on the comparison data non-coherently to determine a timing offset for the signal burst.

According to yet another aspect of the present invention, a method is useful for estimating a frequency of a signal burst transmitted in a digital communication system wherein the signal burst comprises a plurality of reference segments. The method comprises the steps of calculating, for each reference segment, correlation data representative of an amount of correlation between the signal burst and one of a plurality of reference signals offset by a plurality of time offsets. The method further includes the step of generating a frequency domain representation of the correlation data associated with a time offset of the plurality of time offsets yielding a maximum amount of correlation over the plurality of reference segments. The frequency at which the frequency domain representation of the correlation data is a maximum is determined.

DETAILED DESCRIPTION OF THE INVENTION

The present invention provides an apparatus and method for providing timing and frequency offset data for accurate demodulation of a received signal having reference symbols. More particularly, the present invention is useful for jointly (1) synchronizing a receiver clock with the baseband symbol rate transmitter clock, and (2) aligning a receiver oscillator with the frequency of the transmitted carrier signal.

Figure 1:
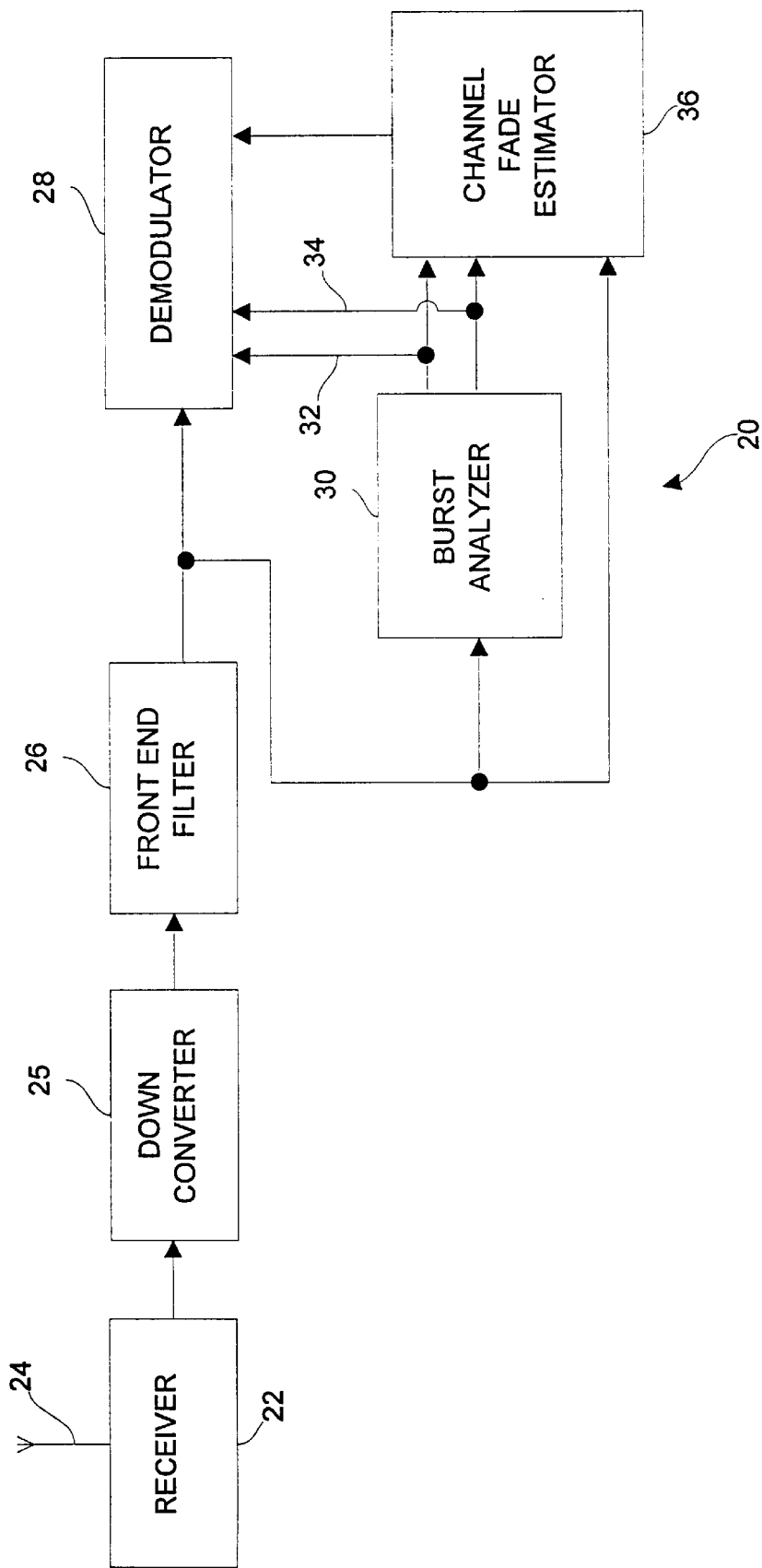
FIG. 1 is a diagram of a receiving portion of a digital communication system incorporating a burst analyzer in accordance with one embodiment of the present invention.

Referring to FIG. 1, a digital communication system 20 includes a receiver 22 and an antenna 24 for receiving a signal transmitted from another portion (not shown) of the digital communication system 20. The received signal is down-converted by a down-converter 25 and then filtered by a front end filter 26, which may be a pass band filter for removing any out-of-band frequencies and re-developing the baseband signal. The received baseband signal (hereinafter referred to for simplicity as "the received signal") is then provided to a demodulator 28 and a burst analyzer 30. In order to demodulate the received signal accurately, the demodulator 28 receives on lines 32 and 34 a timing synchronization signal $t_{SYNCH}$ and a frequency offset signal $f_{OFFSET}$, respectively, each of which is generated by the burst analyzer 30 in accordance with the present invention. The demodulator 28 includes a clock (not shown) and an oscillator (not shown) that utilize the timing and frequency signals, respectively, to accurately demodulate the received signal. The timing synchronization signal and the frequency offset signal are also provided to a channel fade estimator 36, which is also coupled to the front end filter 26 for provision of the received signal. As is known to those skilled in the art, the channel fade estimator 36 tracks the channel complex gain resulting from channel fading, and provides that information to the demodulator for compensation.

The digital communication system 20 may, for example, transmit a time-division multiplexed access (TDMA) signal for accommodating a number of users. TDMA and other systems known to those skilled in the art may transmit a plurality of different types of signal bursts to provide control information as well as voice, data, or other information. For instance, prior to transmission of any voice information, a typical TDMA system may transmit a random access channel (RACH) burst that provides the receiving portion of the digital communication system 20 with rough estimates (i.e., ranges) of the timing and frequency of the subsequent signal bursts. In general, however, it will be appreciated that a variety of techniques for providing rough estimates of both timing and frequency are known to those skilled in the art. Accordingly, the method and apparatus of the present invention should not be limited to digital communication systems utilizing a particular multiplexing scheme.

The digital communication system 20 may comprise a mobile satellite communication system. However, the present invention is more generally applicable to any communication system in which accurate timing and frequency estimates are necessary for demodulation of the received signal. For example, any wireless communication system in which a constant envelope signal (or a signal with memory) is transmitted can benefit from an accurate determination of both the timing and frequency of the signal burst, as provided by the method and apparatus of the present invention.

In general, the digital communication system 20 may utilize a variety of different bandwidth-efficient modulation schemes. The present invention is particularly useful with the modulation scheme specified by a typical mobile satellite communication system, which transmits a Gaussian Minimum Shift Keyed (GMSK) signal burst, $\tilde{s}(t)$, defined in complex form as:

$$\tilde{s}(t) = \text{Re}\{\tilde{s}_{GMSK}(t - \epsilon T)e^{j(2\pi \Delta f t + \theta_c)}\}$$

where $\epsilon$ represents the timing offset introduced during transmission (normalized by the symbol period T), $\Delta f$ is the carrier frequency drift introduced by the channel, and $\theta_c$ is the initial carrier phase. The values $\epsilon$ and $\Delta f$ may be derived from the respective signals $t_{SYNCH}$ and $f_{OFFSET}$, which are, in turn, generated as set forth hereinbelow. The received signal $\tilde{s}(t)$ may have a 3 dB bandwidth B normalized by a symbol period T (i.e., the bandwidth-symbol period product BT) of 0.3. It shall be understood, however, that the effectiveness of the present invention is not limited to any particular normalized bandwidth, or any particular channel condition or noise level. For the sake of simplicity only, additive white Gaussian noise (AWGN) has been assumed ( $\tilde{s}(t)$+AWGN shall be referred to as $\tilde{r}(t)$) and, thus, the GMSK signal ma be set forth as:

$$\tilde{s}_{GMSK}(t) = \sqrt{2S} \exp\left(j\left[\theta_n + \pi \sum_{i=n-L+1}^{n} \alpha_i q(t - iT)\right]\right)$$

for $nT \leq t \leq (n+1)T$, which corresponds to an nth time interval with a duration of one symbol (i.e., bit) period, and where S represents the signal strength or amplitude. The data $\{\alpha_i; i=0, \ldots, (N-1)\}$ comprises a differentially encoded version of an independent and identically distributed binary stream generated at rate $T^{-1}$. A phase pulse q(t) comprises the integral of a modulation pulse g(t), which, in turn, is a Gaussian function convolved with a rectangular pulse. The phase pulse q(t) reaches a final value in a time LT, where L is representative of the memory induced by the GMSK modulation, i.e., the amount to which the modulation distributes a bit over several symbol periods.

The modulating pulse g(t) for the GMSK signal $S_{GMSK}(t)$ may be expressed as:

$$g(t) = \frac{1}{2T}\left[Q\left(2\pi\frac{t - T/2}{\sqrt{\ln 2}}\right) - Q\left(2\pi\frac{t + T/2}{\sqrt{\ln 2}}\right)\right]$$

where Q(x) is a Gaussian probability integral as follows:

$$Q(x) = \frac{1}{\sqrt{2\pi}} \int_x^\infty e^{-\frac{1}{2}y^2} dy$$

The phase value $\theta_n$ represents the accumulation of all of the bits that have reached a final value during the nth time interval [nT, (n+1)T], or $$\theta_n = \frac{\pi}{2} \sum_{i=0}^{n-L} \alpha_i \bmod 2\pi$$

$$= \theta_{n-1} + \frac{\pi}{2} \alpha_{n-L} \bmod 2\pi$$

From the above, it is clear that, in this particular modulation scheme, the phase value $\theta_n$ may take on one of four different values:

$$\theta_n \in \{0, \frac{\pi}{2}, \pi, -\frac{\pi}{2}\}$$

Figure 2:
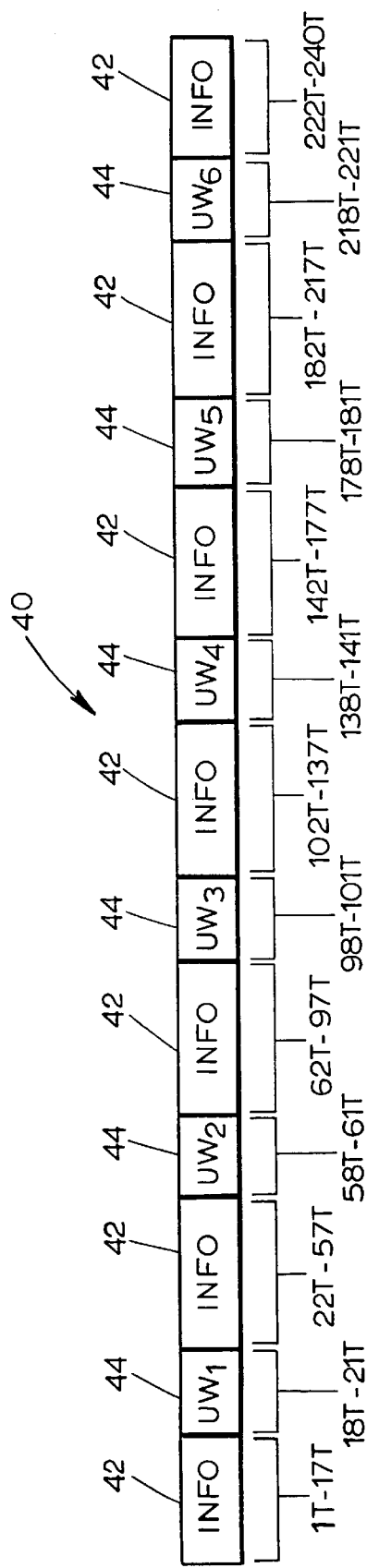
FIG. 2 is a diagram showing an exemplar message format of an information burst analyzed by the burst analyzer of FIG. 1.

Referring now to FIG. 2, the received signal comprises a signal burst 40 having a plurality of segments. The signal burst 40 may comprise, for example, a traffic channel burst, and, therefore, include information segments 42 that primarily carry information (i.e., data) bits rather than bits utilized primarily for control purposes. The information segments 42 are separated by a plurality of reference segments 44, each of which carries reference bits utilized by the apparatus and method of the present invention to estimate timing and frequency. In accordance with the present invention, the reference segments 44 are distributed throughout the signal burst 40. The signal burst 40 may also include other segments (not shown) that provide, for instance, control information.

The reference segments 44 may, but need not, be distributed uniformally across the signal burst 40 as shown. As distributed, however, each reference segment 44 comprises a unique word (UW) that may be the same as, or different from, the other unique words in the signal burst 40. The data in each unique word, of course, must be predetermined (i.e., known by the receiving portion of the digital communication system 20) to enable recognition thereof.

For the purposes of explanation only, the signal burst 40 is shown to include a total of six unique words distributed over a signal burst having 240 symbols or bits. In accordance with one embodiment of the present invention, these six unique words may each comprise the four bits {-1, -1, 1, -1}, the set of which provides sufficient data variation to enable accurate timing estimation. As shown in FIG. 2, after the first information segment 42, which occupies symbol positions 1T-17T, the first unique word $UW_1$ is located at time interval 18T-21T. The locations of the other unique words, normalized by the symbol period T, are also set forth in FIG. 2. With each reference segment 44 taking up four bits, the non-terminal (i.e., internal) information segments 42 comprise 40T segments.

In the digital communication system 20 described above, each unique word is provided to the burst analyzer 30 in the form of a reference signal modulated, for example, according to the memory-inducing GMSK modulation scheme. The modulated reference signal is, therefore, determined at least partially by the information bits in an adjacent information segment 42 to an extent determined by the normalized bandwidth. With BT=0.3, a reasonable approximation for L is 3, meaning that the three nearest bits to any bit in the unique word will affect the shape of the reference signal at that bit position. Thus, for example, with four bits in each unique word and L=3, it can be shown that the burst analyzer 30 must accommodate a total of eight different reference signal waveforms. However, it shall be understood that additional reference waveforms may be necessary in the event that the unique words in the signal burst 40 are not identical.

Figure 3:
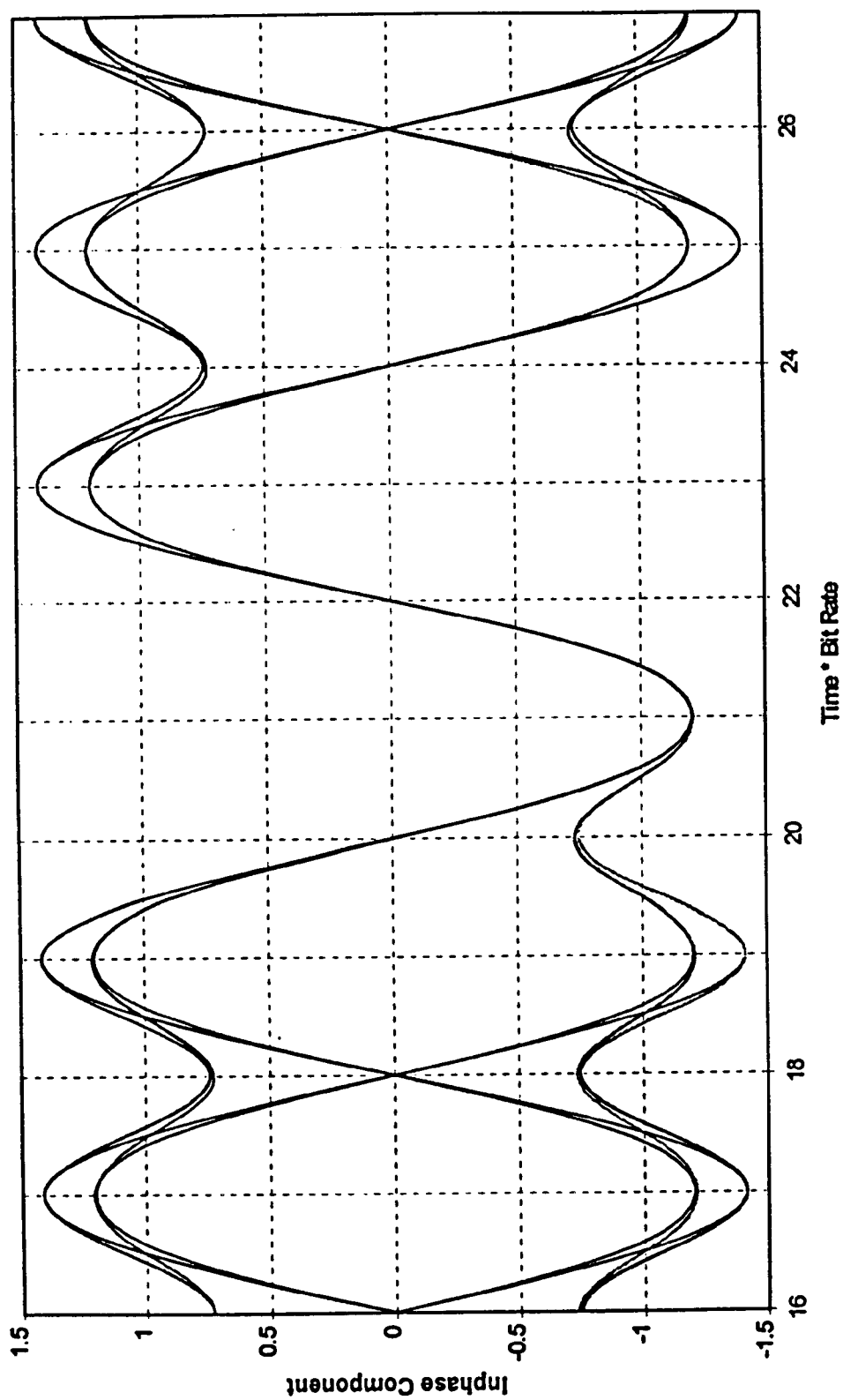
FIG. 3 is an eye pattern diagram showing in-phase components of signal waveforms that may be processed by the receiving portion of the digital communication system of FIG. 1.
Figure 4:
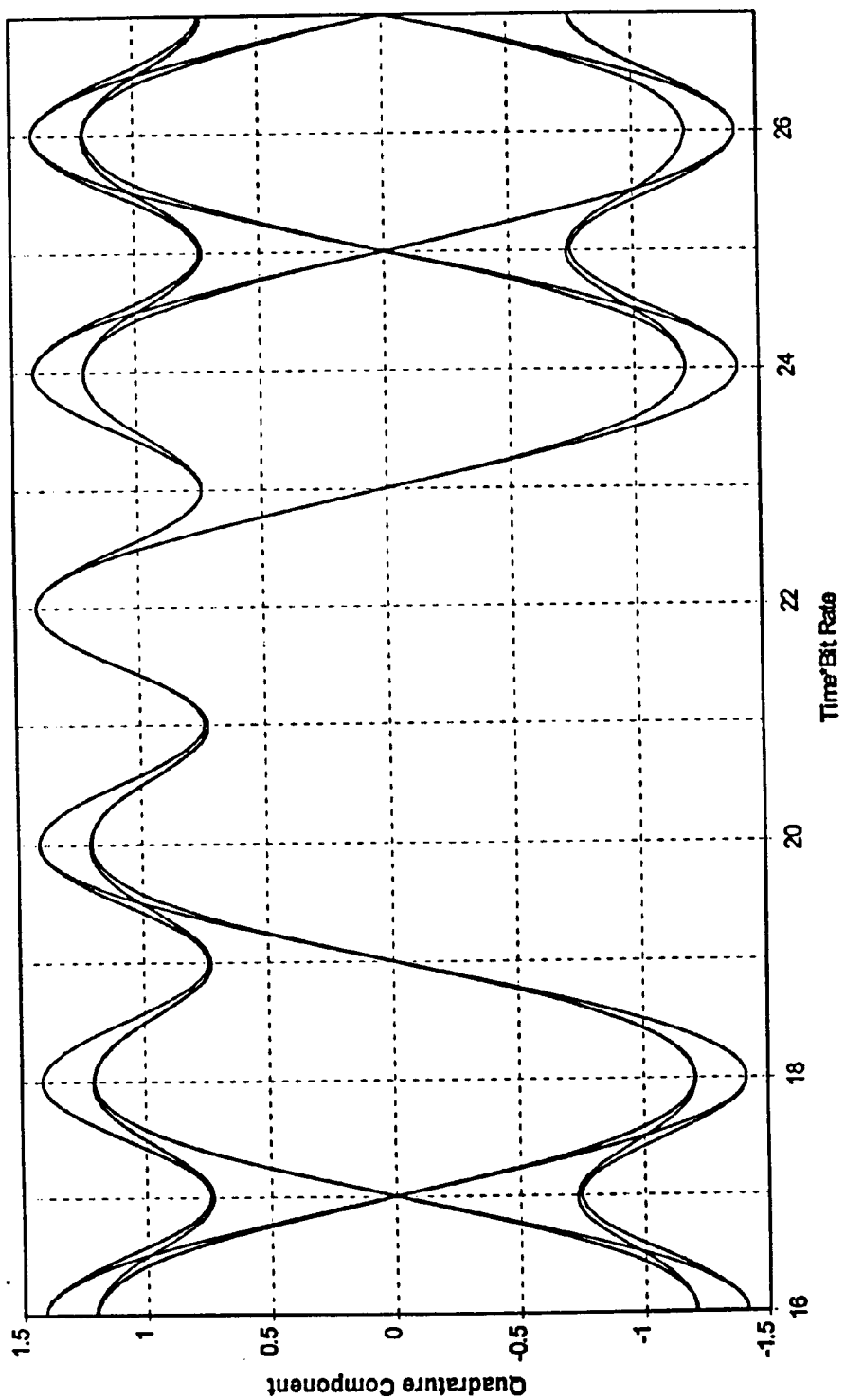
FIG. 4 is an eye pattern diagram showing quadrature components of signal waveforms that may be processed by the receiving portion of the digital communication system of FIG. 1.

FIGS. 3 and 4 illustrate examples of various reference waveforms that may result from the GMSK modulation (with BT=0.3) of the first unique word $UW_1$ (-1,-1,1,-1) located in the time interval (18T, 21T). As is known to those skilled in the art, in a typical GMSK-modulated signal, even numbered bits are transmitted by the in-phase component, while odd numbered bits are transmitted by the quadrature component. Accordingly, FIG. 3 shows an eye pattern of the in-phase component of the reference waveform versus time (normalized by T), while FIG. 4 shows an eye pattern of the quadrature component. In the embodiment of the present invention utilizing the reference waveforms of FIGS. 3 and 4, the in-phase and quadrature components combine to provide a possibility of eight complex reference waveforms. Reference waveforms, as used hereinbelow, are to be understood to comprise complex waveforms and, thus, both the in-phase and quadrature components.

With continued reference to FIGS. 3 and 4, the least-varying portion of each reference waveform shown is located in the time interval (20T, 24T) for the in-phase component and in the time interval (19T, 23T) for the quadrature component. This approximate two-bit delay may be viewed as being introduced by the Gaussian filtering introduced by the modulation and may be accounted for appropriately by the receiving portion of the system 20, as is well known to those skilled in the art.

In view of the eye patterns of FIGS. 3 and 4, the burst analyzer 30 may compare the received signal with a plurality of possible reference waveforms (e.g., eight) to determine the timing and frequency offset information. This comparison occurs during an observation interval corresponding with the locations of the least-varying portions of the received signal. In accordance with the present invention, the burst analyzer 30 may, however, compare the received signal with fewer reference waveforms at the expense of performance degradation As will be explained further hereinbelow, a reference waveform (i.e., one used by the burst analyzer 30) may be designed to constitute an average of two or more of the possible reference waveforms shown in FIGS. 3 and 4. Thus, in principle, the burst analyzer 30 may compare the received signal with as few as only one reference waveform, which would constitute an average of all of the eight possible reference waveforms, or as many as necessary to achieve a certain performance level.

The observation interval of the burst analyzer 30 need not correspond with the number of bits in a unique word. For example, it can be shown that, if the comparison performed by the burst analyzer 30 is extended to a five bit interval, the burst analyzer 30 may then compare the received signal against sixteen different reference waveforms (once again, with L=3). As will be shown hereinbelow, such an extension improves the performance of the present invention. Moreover, performance is improved without having to devote additional bits to the reference segments 44, thereby maintaining the same data throughput rate. As set forth above, however, the number of reference waveforms compared to the received signal may be reduced by averaging two or more of the sixteen reference waveforms to reduce computation times and/or system complexity. Eye patterns similar to those shown in FIGS. 3 and 4 may be used to decide which reference waveforms should be averaged.

Figure 5:
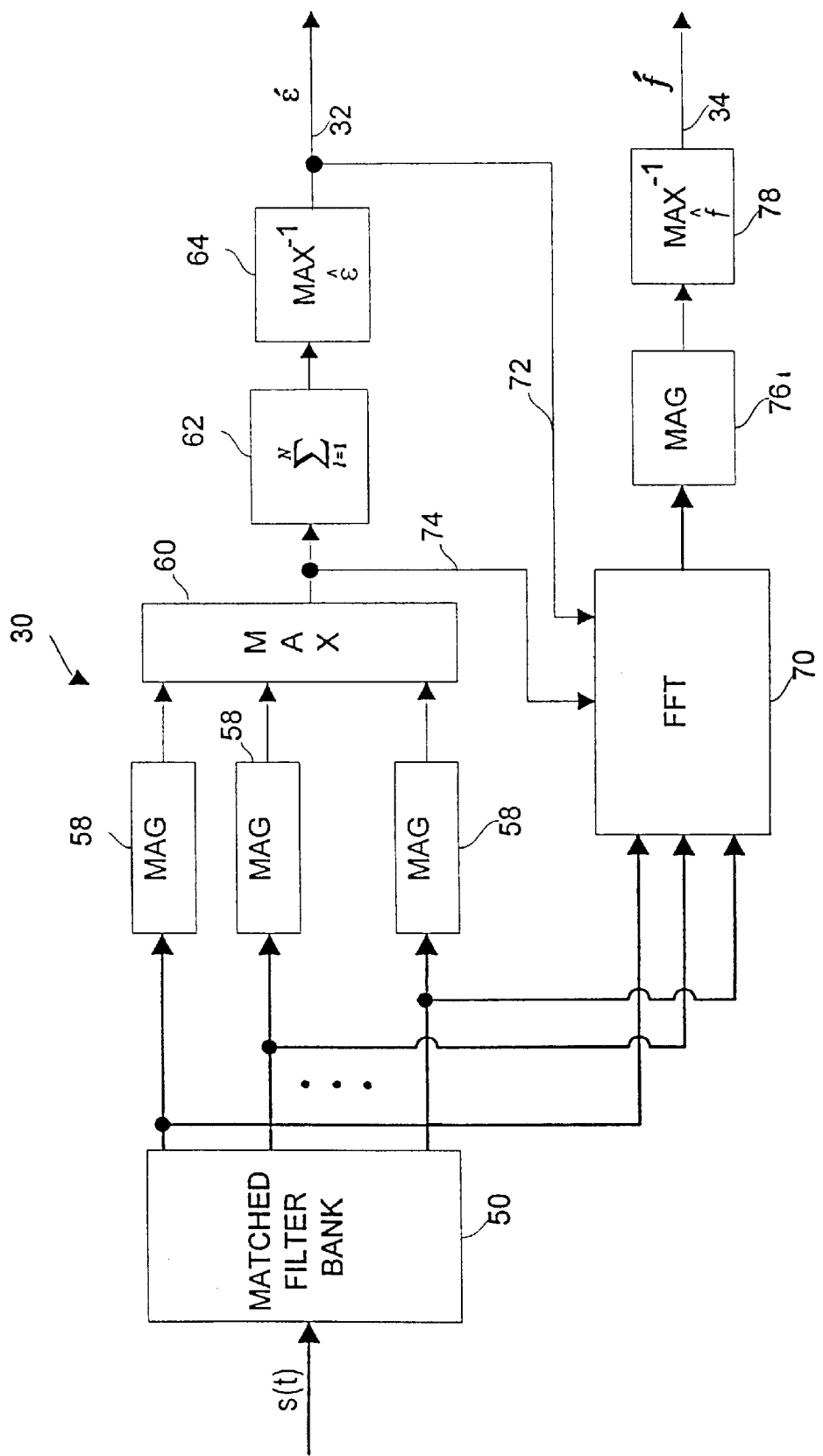
FIG. 5 is a more detailed diagram of the burst analyzer shown in FIG. 1.
Figure 6:
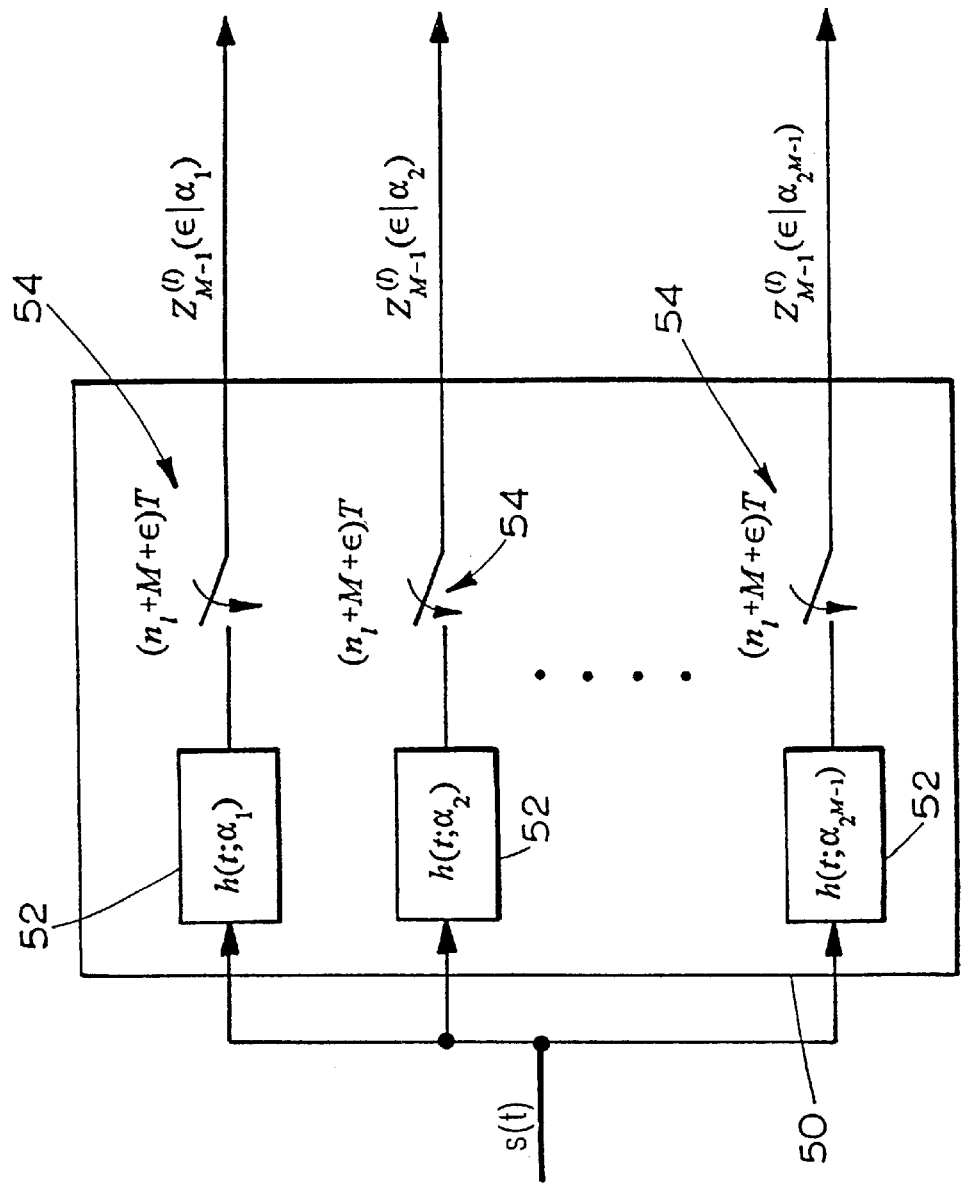
FIG. 6 is a diagram of a matched filter bank for use in the burst analyzer of FIG. 5.

Determining the timing and frequency of the signal burst according to the present invention will now be described. FIG. 5 shows the burst analyzer 30 according to one embodiment of the present invention in greater detail. Heavier (wider) lines indicate transmission of signals representative of complex values, while more narrow lines indicate transmission of signals representative of real values. The received signal $\tilde{r}(t)$ is provided to a matched filter bank 50 comprising a plurality of matched filters 52 (FIG. 6). The number of matched filters 52 corresponds with the number of reference waveforms N that are to be compared with the received signal. The number of reference waveforms N, in turn, corresponds with the size of the set of differentially encoded data $\{\alpha_i; i=0, \ldots, (N-1)\}$, which may be denoted by $\alpha$. As shown in FIG. 6, if M defines the number of symbol or bit periods in an observation (or correlation) interval, then the received signal may be compared with a total $2^{M-1}$ reference signals (with L=3). The length of the observation interval may correspond with the number of bits in each unique word or, alternatively, to increase accuracy, the observation interval length M may be increased such that the number of symbol or bit periods therein is greater than a number of bits in each unique word. However, in the event that possible reference signals are averaged as set forth above, then the number of reference waveforms N utilized for comparison and, hence, the number of matched filters 52, is some number less than $2^{M-1}$.

Each matched filter 52 has an impulse response $h(t,\alpha_i)$ that corresponds with a particular reference waveform to be compared with the received signal. The set of impulse responses corresponding with the set of differentially encoded data may be expressed as:

$$h(t; \dot\alpha) = \begin{cases} \exp\left(-j\pi \sum_{i=-2}^{M-1} \alpha_i q((M-i)T - t)\right), & 0 \le t < MT \\ 0, & \text{otherwise} \end{cases}$$

Thus, the burst analyzer 30 compares the received signal with each reference waveform by convolving the received signal with the impulse response $h(t,\alpha_i)$ associated with each reference waveform over the observation interval. The convolution results in a correlation value $Z^{(I)}_{M-1}(\epsilon|\alpha_i)$, where I identifies the particular unique word or reference segment 44 and $\epsilon$ represents the time offset from the symbol period T.

Referring now to both FIGS. 5 and 6, the matched filter bank 50 also includes a plurality of samplers 54 respectively coupled to each matched filter 52. Each sampler 54 samples the output of its corresponding matched filter 52 at a rate equal to $T^{-1}$ at every $(n_I+M+\epsilon)T$, such that the convolution operation may be expressed as:

$$Z_{M-1}^{(I)}(\epsilon|\alpha)=\tilde{r}(t)*h(t;\alpha)|_{t=(n_I M+\epsilon)T}$$

where $n_I$ identifies the location of the Ith unique word or reference segment 44. For example, for the first unique word $UW_1$ shown in FIG. 2, $n_I$ is equal to 18. In this manner, the matched filter bank 50 calculates the convolution of the received signal at $UW_1$ (e.g., from 18T to 21T, for M=4) with the impulse response associated with a particular reference waveform. As a result of the sampling, a set of the correlation values $Z(\epsilon|\alpha)$ are generated for each reference waveform (as defined by $\alpha_i$) and each time offset $\epsilon$. The above-described correlation calculations are then performed for each reference segment 44, such that $Z(\epsilon|\alpha_i)$ is identified as $Z^{(I)}(\epsilon|\alpha_i)$ in FIGS. 5 and 6 for completeness.

The sets of correlation values $Z(\epsilon|\alpha_i)$ are provided to a plurality of absolute value (or magnitude) generators 58 (FIG. 5) to remove the overall effect of any shift in carrier phase and, therefore, to prepare for the non-coherent combining of the correlation data. Once the magnitude of each of the correlation values has been determined, a maximum correlation value is determined for each reference segment 44 and time offset $\epsilon$ by a maximum correlation value determinator 60. For example, for a burst analyzer 30 handling three reference waveforms, the maximum correlation value for the first unique word ($UW_1$) and time offset $\epsilon_1$ would be expressed as:

$$Z^{(1)}_{max}(\epsilon_1)=\text{MAX}\left[|Z^{(1)}(\epsilon_1,\alpha_1)|, |Z^{(1)}(\epsilon_1,\alpha_2)|, |Z^{(1)}(\epsilon_1,\alpha_3)|\right]$$

The maximum correlation values are stored in a buffer or memory (not shown) as necessary for each time offset and each reference segment 44. Such buffers or memories may be utilized throughout the calculation of the time and frequency offsets and will not be referenced further hereinbelow. It shall be noted that a "maximum correlation value" as used hereinbelow will refer to a correlation value with a maximum magnitude.

As a result of the above-described processing of the correlation data, the correlation data has been modified in preparation for non-coherently combining the correlation data for the entirety of the signal burst 40. Next, the maximum correlation values are provided to a summer or accumulator 62, which sums or otherwise combines the maximum correlation values $Z^{(I)}_{max}$ across the reference segments 44. For the embodiment associated with the signal burst 40 of FIG. 2, the output of the summer 62 may be expressed as the total maximum correlation for a certain time offset $\epsilon_i$:

$$Z_{TOTALmax}(\epsilon_i)=Z^{(1)}_{max}(\epsilon_i)+Z^{(2)}_{max}(\epsilon_i)+\ldots+Z^{(6)}_{max}(\epsilon_i)$$

Because the phase of the received signal is not known a priori, it should be noted that the summer 62 non-coherently combines the correlation statistics over the plurality of unique words or reference segments 44 by summing the magnitudes of the maximum correlation values. This non-coherent combination is also useful in the event that the channel is unknown. It should also be noted that the argument corresponding to the differentially encoded data $\alpha$ is no longer a factor, inasmuch as the correlation data associated with a particular reference waveform having the maximum correlation has already been elected.

Upon determination of each $Z_{TOTALmax}(\epsilon_i)$ for each time offset, the timing offset $\epsilon$ at which the total maximum correlation value $Z_{TOTALmax}(\epsilon_i)$ is a maximum is determined by an inverse maximum value determinator 64. The timing offset $\epsilon$ is then represented by the $t_{SYNCH}$ signal and provided via the line 32 to the demodulator 28 for synchronizing the clock in the demodulator 28 with the signal burst.

The accuracy of the timing offset estimation is based on how finely each symbol period T is analyzed (in other words, the granularity of the normalized time offset $\epsilon$), which, in turn, is determined by the sampling rate. For example, a sampling rate resulting in eight samples per symbol period, without more, would limit the resolution of the burst analyzer 30 to a maximum uncertainty of $\pm T/16$. However, the resolution may be improved by interpolating the results between the samples.

More generally, the above-described technique for determining the timing offset $\epsilon$ in accordance with the present invention may be expressed as:

$$\hat{\varepsilon} = \max_{\varepsilon}^{-1} \sum_{l=1}^{N} \max_{j=1,\ldots,2^{M-1}} |Z_{M-1}^{(l)}(\varepsilon \mid \alpha_j)|$$

where M represents the length of the observation interval. This general representation provides a simple, robust technique for determining the timing offset for a signal burst. This technique can be further justified through the statistical analysis set forth below.

In general, the correlation data generated by the matched filter bank 50 provides a method of accurately estimating the timing offset because the optimal method of estimating the timing offset can be approximated via the convolution process described above. More particularly, the optimal solution is the timing offset that maximizes the likelihood-ratio function averaged over the random phase of the received signal. The likelihood-ratio function essentially compares the received signal with the known reference waveforms as a function of the timing offset. The likelihood of the received signal during the Ith unique word or reference segment 44 having four bits, conditional on knowing the timing offset and the carrier phase, may be expressed as:

$$\Lambda^{(l)}(\tilde{r}(t); (n_l + \epsilon)T \le t < (n_l + 4 + \epsilon)T \mid \epsilon, \alpha, \Psi_c) =$$

$$Ce^{-4\frac{E_b}{N_0}} \exp\left(\frac{\sqrt{2S}}{N_0} \text{Re}\{Z_3^{(l)}(\varepsilon \mid \alpha; H_i)e^{-j\Psi_c}\}\right)$$

where:

$$Z_3^{(l)}(\epsilon \mid \alpha) = \int_{(n_l+\epsilon)T}^{(n_l+4+\epsilon)T} \tilde{r}(t) \exp\left(-j\pi \sum_{i=-2}^{3} \alpha_{n_l+i} q(t - (n_l + i)T - \epsilon T)\right) dt$$

where C is a term independent of the received signal and $\tilde{r}(t)$ is the baseband complex envelope of the received signal. Typically, the phase change due to the frequency term over a unique word interval is small enough that it can be safely absorbed into the initial carrier phase, modifying $\theta_c$ into $\psi_c$. Averaging over the unknown carrier phase, for which we express the quantity $Z_3^{(l)}(\epsilon \mid \alpha)$ in complex form as:

$$Z_3^{(l)}(\epsilon \mid \alpha) = |Z_3^{(l)}(\epsilon \mid \alpha)| \exp(j(Z_3));$$

the resultant averaged likelihood ratio function becomes:

$$\Lambda^{(l)}(\tilde{r}(t); (n_l + \epsilon)T \le t < (n_l + 4 + \epsilon)T \mid \epsilon, \alpha) =$$

$$Ce^{-4\frac{E_b}{N_0}} \frac{1}{2\pi} \int_{-\pi}^{\pi} \exp\left(\frac{\sqrt{2S}}{N_0} |Z_3^{(l)}(\varepsilon \mid \alpha)| \cos(\langle Z_3 + \Psi_c \rangle)\right) d\Psi_c =$$

$$Ce^{-\frac{E_b}{N_0}} I_0\left(\frac{\sqrt{2S}}{N_0} |Z_3^{(l)}(\epsilon \mid \alpha)|\right)$$

where $I_0(x)$ is the zeroth-order modified Bessel function of the first kind. Because the random phase is modeled to be uniformly distributed, the determination of the timing offset will be independent of the carrier phase.

To account for the unknown data bits which contribute to the shape of the reference waveform, the averaged likelihood ratio function is further averaged (over the eight possible reference waveforms), yielding:

$$\Lambda^{(l)}(\tilde{r}(t); (n_l + \epsilon)T \le t < (n_l + 4 + \epsilon)T \mid \epsilon) =$$

$$Ce^{-4\frac{E_b}{N_0}} \frac{1}{8} \sum_{j=1}^{8} I_0\left(\frac{\sqrt{2S}}{N_0} |Z_3^{(l)}(\varepsilon \mid \alpha_j)|\right)$$

Because the noise is independent for different unique word intervals, the statistics may be non-coherently combined by multiplying the individual likelihood ratio functions. The optimal solution for the timing offset is, accordingly, the time offset that maximizes the following likelihood function (or its logarithmic version):

$$\hat{\varepsilon}_{ML} = \max_{\varepsilon}^{-1} \sum_{l=1}^{6} \ln\left[\frac{1}{8} \sum_{j=1}^{8} I_0\left(\frac{\sqrt{2S}}{N_0} |Z_3^{(l)}(\varepsilon \mid \alpha_j)|\right)\right]$$

An embodiment of the present invention implementing the optimal solution as set forth immediately above would be much more complex than the embodiment set forth above in connection with FIGS. 5 and 6. However, the added complexity would not necessarily provide improved performance, as shown hereinbelow.

The optimal maximum-likelihood expression may be simplified to avoid having to evaluate non-linearities and remove the reliance on the signal and noise levels. Such simplifications are desirable in most mobile satellite communication systems, for instance, because shadowing and fading can considerably vary the gain of the received signal burst. More particularly, certain series approximations may be made, namely, that the average of the different $I_0(x)$ terms will be dominated by the term with the largest argument and that $\ln(I_0(x)) \approx x$ for large x. Such approximations lead to the following simplifications, which remove any dependence on the signal amplitude or strength S, the noise $N_0$, or the non-linearity introduced by the Bessel function $I_0$:

$$\sum_{l=1}^{6} \ln\left[\frac{1}{8} \sum_{j=1}^{8} I_0\left(\frac{\sqrt{2S}}{N_0} |Z_3^{(l)}(\varepsilon \mid \alpha_j)|\right)\right] \approx$$

$$\sum_{l=1}^{6} \ln\left[I_0\left(\frac{\sqrt{2S}}{N_0} \max_{j=1,\Lambda,8} |Z_3^{(l)}(\varepsilon \mid \alpha_j)|\right)\right] \approx$$

$$\sum_{l=1}^{6} \frac{\sqrt{2S}}{N_0} \max_{j=1,\Lambda,8} |Z_3^{(l)}(\varepsilon \mid \alpha_j)|$$

$$\propto \sum_{l=1}^{6} \max_{j=1,\Lambda,8} |Z_3^{(l)}(\varepsilon \mid \alpha_j)|$$

As explained above, for performance enhancement, the correlation interval for the matched filter 50 may be extended beyond the number of bits in a reference segment 44. The averaging operation, however, accounts for inter-symbol interference effect caused by the random information bits adjacent the reference segment 44. Thus, as set forth above, the more general expression that extends the corre lation interval to M bits and non-coherently combines statistics from the different unique words may be expressed as:

$$\hat{\varepsilon} = \max_{\varepsilon}^{-1} \sum_{l=1}^{N} \max_{j=1,\ldots,2^{M-1}} |Z_{M-1}^{(l)}(\varepsilon|\alpha_j)|$$

where N is the number of unique words or reference segments 44. As described above, the quantity $Z^{(l)}_{M-1}(\epsilon|\alpha)$ may also be expressed as the convolution of the received signal $\tilde{r}(t)$ with a set of filters each having impulse responses matched to the reference waveforms.

With reference again to FIG. 5, the determination of the frequency offset for the signal burst will now be described. Generally, the frequency offset determination is based on both the current time offset $\epsilon$ (determined as set forth above in accordance with the present invention) and the correlation data utilized to generate it. However, before describing the technique for arriving at such a determination, it can be shown that the output of the matched filter bank 50 is a function of the incoming frequency $f_a$. For example, for an AWGN (additive white Gaussian noise) channel, the correlation value $Z^{(l)}_3$ for the Ith unique word is a Gaussian random variable because the matched filter bank 50 comprises a linear operator that preserves the Gaussian characteristics of the received signal. In other words, the correlation value may be expressed as a summation of signal and noise portions:

$$Z_3^{(l)} = Z_{3,s}^{(l)} + Z_{3,n}^{(l)}$$

The noise portion of the correlation value has a mean of zero and a variance that may be shown to be $2N_0(4T)$. It shall be further noted that the noise portions across different reference segments 44 are un-correlated and, therefore, independent, or —

$$COV\{Z_{3,n}^{(l)}(Z_{3,n}^{(m)})^*\} = \begin{cases} 2N_0(4T), & m = l \\ 0, & \text{otherwise} \end{cases}$$

Once the correct timing offset $\hat{\epsilon}$ has been determined, the correct matched filtering operation may be selected for each unique word in the signal burst. The correct matched filter 52 will, in turn, remove the effect of the GMSK modulation, leaving the signal part of the selected correlation values dependent only on the frequency and phase shifts introduced by the channel. In other words, the signal part of the selected correlation values may be expressed as a continuous wave:

$$Z_{3,s}^{(l)} = \sqrt{2S} \int_{n_l T}^{(n_l+4)T} e^{j(2\pi f_a t + \theta_a)} dt$$

$$= \sqrt{2S} \, e^{j\theta_a} e^{j2\pi f_a(n_l+4)T} - \frac{e^{j2\pi f_a n_l T}}{j2\pi f_a}$$

$$= \sqrt{2S} \, 4T \, \text{sinc}(4f_a T) e^{j2\pi f_a n_l T} e^{j(\theta_a + 4\pi f_a T)}$$

where $\text{sinc}(x) = \sin(\pi x)/\pi x$. By properly rearranging terms, the signal part of the correlation value may be expressed as a single-tone (i.e., a continuous wave) of which we have six samples separated equally by 40T:

$$Z_{3,s}^{(l)} = b_0 e^{j(2\pi f_a(l-1)40T+\theta_0)}; \quad l=1,2,\ldots 6$$

where the amplitude and phase are defined as:

$$b_0 = \sqrt{2S} 4T \sin c(4f_a T)$$

and $$\theta_0 = \theta_a + 2\pi f_a(20T)$$

Typically, the incoming frequency falls within a range such that $4f_a T \ll 1$ and, thus, the amplitude may be approximated as:

$$b_0 \approx \sqrt{2S} 4T$$

which is independent of the incoming frequency $f_a$.

In summary for the embodiment described above, the matched filter bank 50 transforms a GMSK signal burst having six unique words into a set of six samples of a continuous wave spanning the 240 bit signal burst. Those samples are taken uniformly at a rate of $(40T)^{-1}$ Hz:

$$Z_3^{(l)} = b_0 \exp\left(j\left(2\pi f_a \frac{(l-1)}{B} + \theta_0\right)\right) + Z_{3,n}^{(l)}; \quad l = 1, 2, \ldots, N$$

It shall be noted that the uniform distribution of the unique words over the signal burst is not necessary for the practice of the present invention. Moreover, the exact locations of the unique words within the signal burst are also not crucial, as the burst analyzer 30 will be aware of the general locations of the unique words. However, the distributed nature of the unique words does provide more meaningful sample data.

As shown in FIG. 5, the correlation values generated by the matched filter bank 50 are provided to a discrete-time Fourier transformer 70, which may implement a Fast Fourier Transform (FFT) algorithm. The Fourier transformer 70 is coupled to each of the matched filters 52 and then elects particular correlation values depending on the current timing offset $\hat{\epsilon}$ and the maximum correlation values provided on lines 72 and 74, respectively. Knowing that the correlation data from the matched filter bank 50 (for the correct timing offset and correct reference waveform) provides a plurality of samples of a continuous wave, the frequency of that wave can be determined from the frequency domain distribution generated from the Fourier transform operation. The frequency domain distribution is provided to an absolute value or magnitude generator 76, which, in turn, may provide the magnitude of the frequency domain distribution to a memory (not shown). That same memory may also be utilized by the Fourier transformer 70 to analyze the correlation data. The memory may collect data representative of the frequency domain distribution of the correlation data for a predetermined time period, and then an inverse maximum value determinator 78 analyzes the data to determine the frequency $f_a$ at which the magnitude of the frequency domain distribution is a maximum. To this end, the inverse maximum value determinator 78 generates a signal equal to, or representative of, the $f_{OFFSET}$ signal on the line 34.

The above-described technique for determining the actual frequency $f_a$ of the incoming signal burst may be further justified via statistical analysis based on the optimal likelihood-ratio function. The likelihood function at the output of the matched filter bank 50 may be written as:

$$\Lambda(Z_3^{(l)}; l=1,2,\ldots,N|b_0,f,\theta_0)$$

$$\Lambda(Z_3^{(l)}; l = 1, 2, \ldots, N | b_0, f, \theta_0)$$

$$= Ce^{-4\frac{E_b}{N_0}} \exp\left\{\frac{b_0}{N_0(4T)} \text{Re}\left\{\left[\sum_{l=1}^{N} Z_3^{(l)} e^{-j2\pi \frac{f(l-1)}{B}}\right] e^{-j\theta_0}\right\}\right\}$$

where C is a term independent of the received signal. Because the phase of the received signal is unknown, the likelihood must be averaged over the random phase, for which we express the quantity $Z^{(l)}_3$ in complex form as set forth above. The resultant averaged likelihood-ratio function becomes:

$$\Lambda(Z_3^{(l)},l=1,2,\ldots,N|b_0,f,\theta_0)$$

$$= Ce^{-4\frac{E_b}{N_0}}\frac{1}{2\pi}\int_{-\pi}^{\pi}\exp\left(\frac{b_0}{N_0(4T)}\left|\sum_{l=1}^{N}Z_3^{(l)}e^{-j2\pi f\frac{(l-1)}{B}}\right|\cos(\langle Z_3+\theta_0\rangle)\right)d\theta_0$$

$$\Lambda(Z_3^{(l)};l=1,2,\ldots,N|b_0,f,\theta_0) =$$

$$Ce^{-4\frac{E_b}{N_0}}\frac{1}{2\pi}\int_{-\pi}^{\pi}\exp\left(\frac{b_0}{N_0(4T)}\left|\sum_{l=1}^{N}Z_3^{(l)}e^{j2\pi\frac{f(l-1)}{B}}\right|\cos(\langle Z_3+\theta_0\rangle)\right)d\theta_0 =$$

$$Ce^{-4\frac{E_b}{N_0}}I_0\left(\frac{b_0}{N_0(4T)}\left|\sum_{l=1}^{N}Z_3^{(l)}e^{-j2\pi\frac{f(l-1)}{B}}\right|\right)$$

The estimate of the frequency under the unknown phase condition is the value at which the likelihood is maximized:

$$f_{ML} = \max_{f}{}^{-1} I_0\left(\frac{b_0}{N_0(4T)}\left|\sum_{l=1}^{N}Z_3^{(l)}e^{-j2\pi\frac{f(l-1)}{B}}\right|\right)$$

$$= \max_{f}{}^{-1}\left|\sum_{l=1}^{N}Z_3^{(l)}e^{-j2\pi\frac{f(l-1)}{B}}\right|$$

A closer look at the likelihood function to be maximized reveals that it is the magnitude of the discrete-time Fourier transform (DFT) evaluated at the frequencies to be tested. The DFT may be expressed as:

$$DFT(f) = \sum_{l=1}^{N}Z_3^{(l)}e^{-j2\pi f\frac{(l-1)}{B}}$$

where the discrete-time points are sampled at a rate B (Hz). While the present invention is not limited to the manner in which the DFT is implemented, well-known procedures for performing a fast fourier transform (FFT) are computationally efficient. Such procedures may be advantageous for extending the observation interval to M bits (as set forth above in connection with the timing offset determination), such that the carrier frequency estimate becomes:

$$\hat{f} = \max_{f}{}^{-1}\left|\sum_{l=1}^{N}Z_{M-1}^{(l)}e^{-j2\pi f\frac{(l-1)}{B}}\right|$$

where the correlation values Z are selected from the set of correlation values based on the signals on the lines 72 and 74. As was the case in connection with the timing offset determination, performance has been shown to improve with M larger than four (the number of bits in an unique word).

Figure 7:
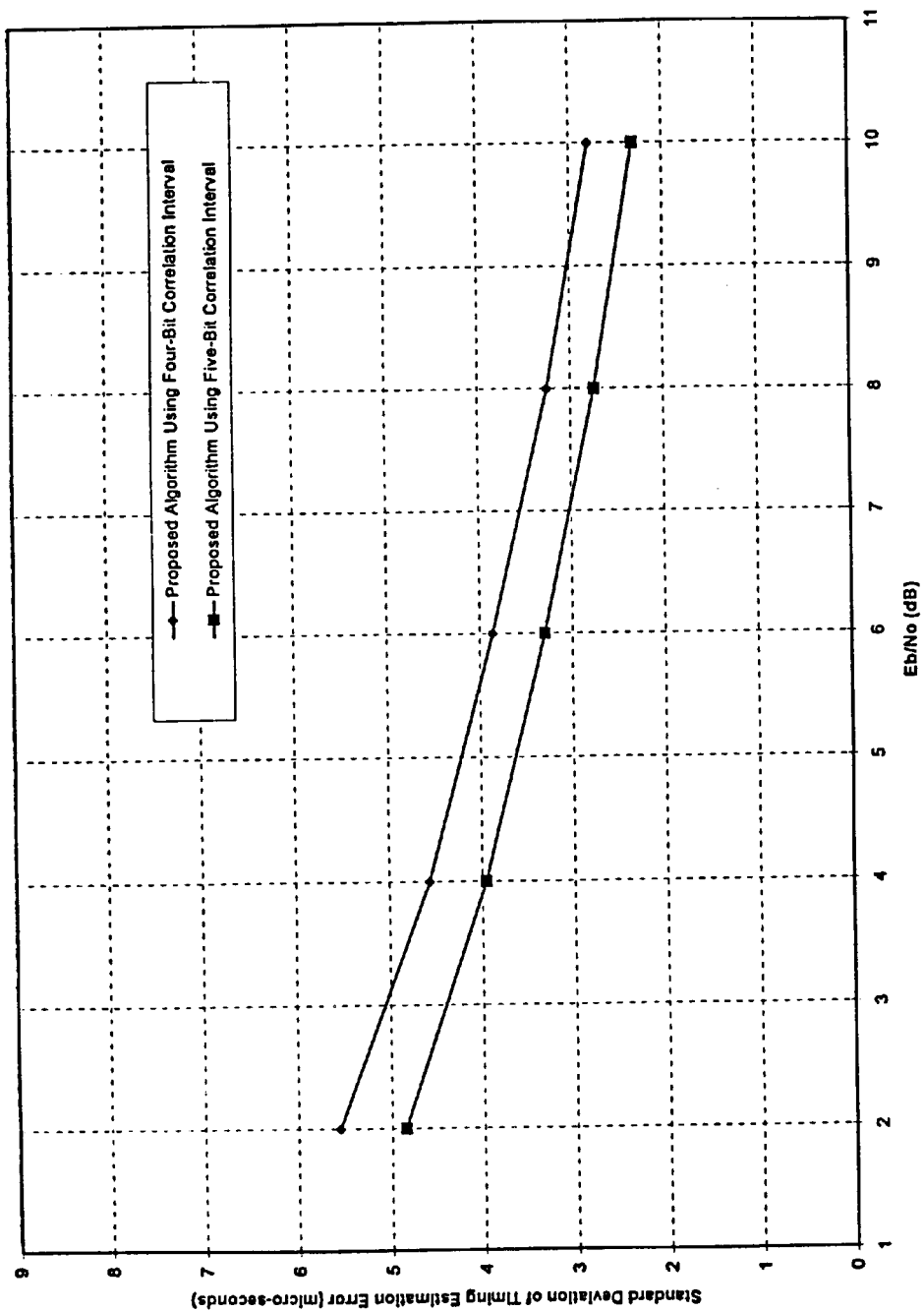
FIG. 7 is a chart plotting the timing estimation error introduced as a result of practicing the present invention in accordance with two different embodiments thereof.
Figure 8:
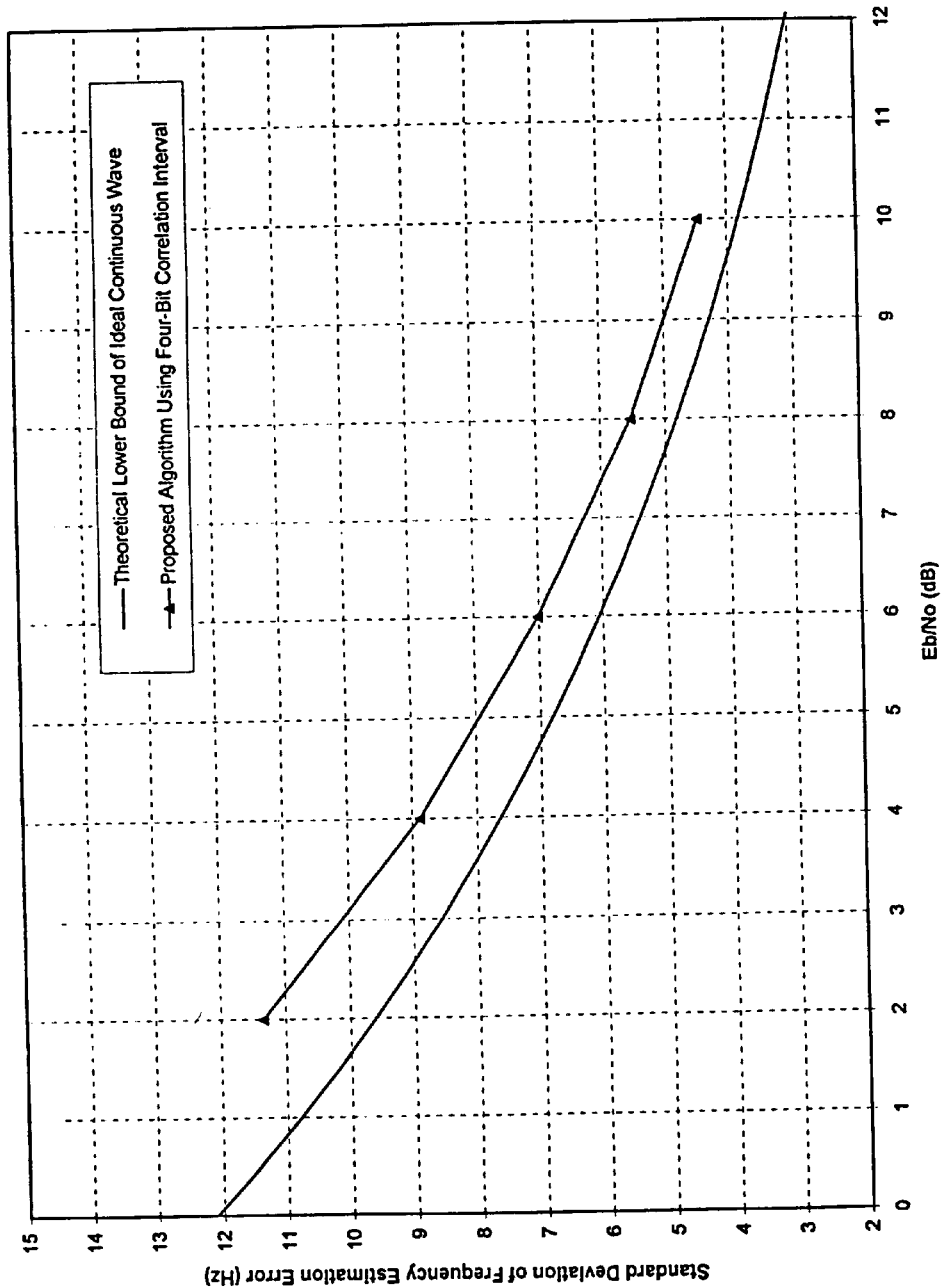
FIG. 8 is a chart plotting the frequency estimation error introduced as a result of practicing the present invention, together with a theoretical lower bound for the error based on an ideal, continuous wave.

With reference now to FIGS. 7 and 8, the performance of the above-described method and apparatus for joint determination of timing and frequency offsets is shown in terms of estimation error. The amount of error is presented as the standard deviation of the estimation error as a function of the signal energy per bit to noise power spectral density $E_b/N_0$ of the received waveform. For the purposes of evaluation only, the timing uncertainty was set to ±14 microseconds and the frequency was set to ±200 Hz.

FIG. 7 shows the timing synchronization performance when using four- and five-bit correlation intervals. The five-bit correlation interval embodiment provides about 1.5 dB of gain in required input signal to noise ratio (SNR) over the four-bit embodiment (for a fixed amount of estimation error). Thus, the extension of the correlation interval provides significant performance improvements. Further, bandwidth-efficient systems that can only assign a small number of reference bits will benefit greatly from that particular embodiment. Despite these improvements, it shall be noted that the present invention is not limited to embodiments that extend the correlation interval beyond what has been assigned as reference information, and certainly not to an embodiment utilizing a four- or five-bit correlation interval.

As shown hereinabove, the performance of the frequency offset determination method and apparatus depends on the accuracy of the timing synchronization. As shown in FIG. 8, the performance of the present invention with the timing uncertainty set to ±14 microseconds is quite comparable to the theoretical lower bound of a continuous wave (i.e., perfect timing conditions). The ideal situation may be expressed as a function of $E_b/N_0$ as follows:

$$\sigma_{LB} = \sqrt{\frac{3}{8\pi^2}\frac{N}{N^2-1}}\left(\frac{E_b}{N_0}\right)^{-1/2}(\text{N\_bits }T)^{-1}$$

where N_bits is the number of bits in the signal burst. The performance data shown in FIG. 8 evaluated a 240 bit signal burst embodiment, with four-bit unique words and a four-bit correlation interval. Improvements may be obtained by increasing the correlation interval in accordance with the present invention.

As shown in FIGS. 7 and 8 and set forth above, the present invention provides accurate determinations of both the timing and frequency of a signal burst in a feed forward manner (i.e., no feedback necessary). However, in certain applications of the present invention requiring even greater accuracy, the estimation error may be further improved by providing a closed loop system incorporating the present invention and a memory and processor (not shown) for providing tracking over different signal bursts.

The present invention is not limited to application to an AWGN (additive white Gaussian noise) channel. The method and apparatus of the present invention have exhibited a high degree of robustness in other environments frequently encountered in mobile satellite communications including, for example, Rician fading channels that are moderately or severely frequency-selective channels.

The method and apparatus according to the present invention may also be implemented in a variety of ways. The steps of the inventive method may be carried out by a general purpose processor programmed with software routine(s) in accordance with the present invention. Alternatively, the general purpose processor may be replaced with a digital signal processor in the form of an ASIC or other specialized IC designed to perform the steps of the inventive method. It shall be understood that, regardless of the hardware utilized, the present invention may be implemented using any combination of hardware, software, and firmware.

The burst analyzer 30 may have additional components utilized to classify incoming bursts according to burst type. Burst classification utilizing some of the same burst analysis techniques set forth above in connection timing and frequency estimation constitutes the subject matter of a co-pending application filed concurrently herewith, entitled "Method and Apparatus for Signal Burst Classification," and assigned to the assignee of the present application, the disclosure of which is hereby expressly incorporated by reference.

Numerous other modifications and alternative embodiments of the invention will be apparent to those skilled in the art in view of the foregoing description. Accordingly, this description is to be construed as illustrative only. The details of the structure and method may be varied substantially without departing from the spirit of the invention, and the exclusive use of all modifications which are within the scope of the appending claims is reserved.

What is claimed is:

1. A burst analyzer for use in a digital communication system transmitting a signal burst, the burst analyzer comprising:

a filter that generates correlation data based on the signal burst and a plurality of reference signals offset by a plurality of time offsets; and an accumulator that combines quantities based on the correlation data generated by the filter for a plurality of reference segments distributed within the signal burst.

2. The burst analyzer of claim 1, further comprising means coupled to the filter for modifying the correlation data such that the accumulator non-coherently combines the correlation data.

3. The burst analyzer of claim 1, wherein the accumulator comprises a summer.

4. The burst analyzer of claim 3, further comprising:

first means for determining, for each reference segment of the signal burst, a maximum correlation value from the correlation data for each time offset; and second means for determining the time offset at which a sum of the maximum correlation values calculated by the summer for the plurality of reference segments is a maximum.

5. The burst analyzer of claim 1, wherein the signal burst is modulated according to a memory-inducing modulation scheme.

6. The burst analyzer of claim 1, wherein the filter compares the signal burst and the reference signals over a correlation interval spanning a time period corresponding to the length of each reference segment.

7. The burst analyzer of claim 1, wherein the filter compares the signal burst and the reference signals over a correlation interval spanning a time period greater than the length of each reference segment.

8. The burst analyzer of claim 1, wherein:

each reference segment comprises a unique word; and at least one of the reference signals is representative of an average of a plurality of possible signals representative of the unique word subsequent to modulation.

9. The burst analyzer of claim 1, wherein the signal burst comprises a GMSK-modulated signal.

10. The burst analyzer of claim 1, wherein the filter comprises:

a plurality of matched filters wherein each matched filter has an impulse response matched to a corresponding reference signal of the plurality of reference signals such that each matched filter generates a convolution signal representative of the convolution of the signal burst and the respective impulse response matched to the corresponding reference signal; and a plurality of samplers coupled to the plurality of matched filters, respectively, that sample the convolution signals at a rate commensurate with a bit transmission rate for the signal burst.

11. The burst analyzer of claim 1, wherein each reference segment transmits an identical unique word.

12. The burst analyzer of claim 1, wherein:

a first reference segment of the plurality of reference segments transmits a first unique word and a second reference segment of the plurality of reference segments transmits a second unique word; and the first and second unique words are different.

13. The burst analyzer of claim 4, further comprising:

a Fourier transformer coupled to the filter wherein the Fourier transformer generates, from the correlation data, a discrete-time frequency domain representation of the maximum correlation values based on the time offset at which the sum of the maximum correlation values is a maximum; and third means responsive to the Fourier transformer for determining a frequency at which the discrete-time frequency domain representation is a maximum.

14. The burst analyzer of claim 13, wherein the Fourier transformer comprises means for performing a fast Fourier transform.

15. The burst analyzer of claim 13, wherein the filter compares the signal burst and the reference signals over a correlation interval spanning a time period greater than the length of each reference segment.

16. The burst analyzer of claim 1, wherein the reference segments are separated by respective information segments.

17. A method of synchronization in a digital communication system transmitting a signal burst, the method comprising the steps of:

(a) calculating correlation data based on the signal burst and a plurality of reference signals offset by a plurality of time offsets; and (b) combining quantities based on the correlation data for a plurality of reference segments distributed throughout the signal burst.

18. The method of claim 17, further comprising the step of preparing the correlation data for non-coherent combination.

19. The method of claim 17, further comprising the step of determining, for each reference segment and each time offset, a maximum correlation value from the correlation data.

20. The method of claim 19, wherein step (b) comprises the step of combining, for each time offset, the maximum correlation values associated with each reference segment into a maximum correlation sum.

21. The method of claim 20, further comprising the step of finding the time offset of the plurality of time offsets at which the maximum correlation sum is a maximum.

22. The method of claim 21, further comprising the steps of:

generating a frequency domain representation of the maximum correlation values based on the time offset at which the maximum correlation sum is a maximum; and determining a frequency at which the frequency domain representation is a maximum.

23. The method of claim 17, wherein step (a) comprises the step of convolving the signal burst with a set of filters matched to the plurality of reference signals, respectively.

24. The method of claim 17, wherein the signal burst is modulated according to a memory-inducing modulation scheme.

25. The method of claim 17, wherein step (a) is performed, for each reference segment, over an observation interval spanning a time period corresponding to the length of each reference segment.

26. The method of claim 17, wherein step (a) is performed, for each reference segment, over an observation interval spanning a time period greater than the length of each reference segment.

27. The method of claim 17, wherein:
each reference segment comprises a unique word; and
at least one of the reference signals is representative of an average of a plurality of possible signals representative of the unique word subsequent to modulation.

28. The method of claim 17, wherein the signal burst comprises a GMSK-modulated signal.

29. The method of claim 17, wherein step (a) comprises the step of convolving the signal burst with a plurality of filters having respective impulse responses matched to a corresponding reference signal to generate convolution data.

30. The method of claim 29, wherein step (a) further comprises the step of sampling the convolution data at a rate commensurate with a bit transmission rate for the signal burst.

31. The method of claim 17, wherein each reference signal transmits an identical unique word.

32. The method of claim 17, wherein:
a first reference segment of the plurality of reference segments transmits a first unique word and a second reference segment of the plurality of reference segments transmits a second unique word; and
the first and second unique words are different.

33. The method of claim 17, wherein the reference segments are separated by respective information segments.

34. A method of synchronization in a digital communication system transmitting a signal burst modulated by a modulation scheme that induces memory therein, the method comprising the steps of:
(a) comparing the signal burst with a plurality of possible reference waveforms to generate comparison data not reflecting the memory induced by the modulation scheme; and
(b) combining quantities based on the comparison data non-coherently to determine a timing offset for the signal burst.

35. The method of claim 34, wherein step (a) comprises the steps of:
convolving the signal burst with a plurality of filters having respective impulse responses associated with the plurality of possible reference waveforms, respectively, such that the comparison data comprises convolution data; and
sampling the convolution data.

36. The method of claim 34, wherein:
the signal burst comprises a plurality of reference segments distributed therein;
step (a) is performed over a plurality of observation intervals; and
each observation interval spans a respective reference segment.

37. The method of claim 36, wherein the observation interval extends beyond each reference segment.

38. The method of claim 36, wherein:
each reference segment comprises a unique word; and
at least one of the reference signals is representative of an average of a plurality of possible signals representative of the unique word subsequent to modulation.

39. The method of claim 34, wherein:
a first reference segment of the plurality of reference segments transmits a first unique word and a second reference segment of the plurality of reference segments transmits a second unique word; and
the first and second unique words are different.

40. The method of claim 34, further comprising the steps of:
generating a frequency domain representation from the comparison data based on the timing offset; and
evaluating the frequency domain representation to determine an offset frequency.

41. The method of claim 40, wherein the step of generating the frequency domain representation comprises calculating a fast Fourier transform of the comparison data based on the timing offset.

42. The method of claim 34, further comprising the step of recording the timing offset to provide information for subsequent burst synchronization.

43. A method for estimating a frequency of a signal burst transmitted in a digital communication system wherein the signal burst comprises a plurality of reference segments, the method comprising the steps of:
(a) calculating, for each reference segment, correlation data representative of an amount of correlation between the signal burst and one of a plurality of reference signals offset by a plurality of time offsets;
(b) generating a frequency domain representation of the correlation data associated with a particular time offset of the plurality of time offsets yielding a maximum amount of correlation over the plurality of reference segments; and
(c) determining the frequency at which the frequency domain representation of the correlation data is a maximum.

44. The method of claim 43, wherein the plurality of reference segments are distributed within the signal burst.

45. The method of claim 43, wherein the signal burst is modulated according to a memory-inducing modulation scheme.

46. The method of claim 43, wherein:
step (a) is performed over a plurality of observation intervals;
each observation interval spans a respective reference segment; and
the observation interval extends beyond each reference segment.

47. The method of claim 43, wherein step (a) comprises convolving the signal burst with a plurality of filters having respective impulse responses matched to the plurality of reference signals, respectively.

48. The method of claim 43, further comprising the step of recording the frequency to provide information for subsequent burst analysis.

49. A burst analyzer as claimed in claim 1, wherein:
each of said reference segments includes at least one of said reference signals.

50. A burst analyzer as claimed in claim 1, wherein:
said accumulator combines said quantities by summing for a plurality of said reference segments the magnitudes of those of said correlation data having maximum correlation values.

51. A burst analyzer as claimed in claim 17, wherein:
each of said reference segments includes at least one of said reference signals.

52. A burst analyzer as claimed in claim 17, wherein:
said combining step combines said quantities by summing for a plurality of said reference segments the magnitudes of those of said correlation data having maximum correlation values.

* * * * *